May 25, 1943.  V. R. KOKATNUR ET AL  2,320,242
METHOD OF PURIFYING SULPHURIC ACID MIXTURES
Filed April 10, 1940
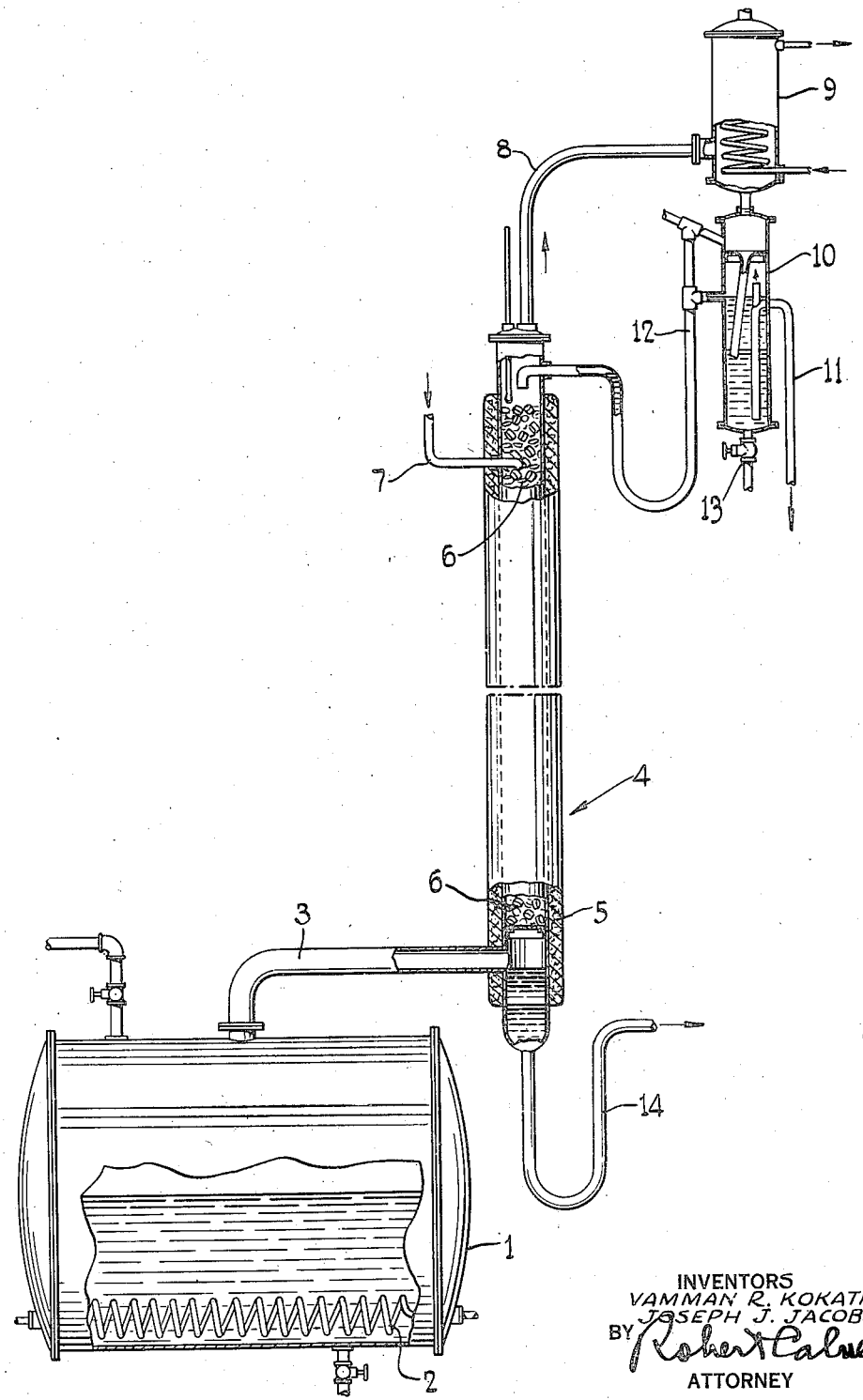
INVENTORS
VAMMAN R. KOKATNUR
JOSEPH J. JACOBS
BY Robert Calvert
ATTORNEY Patented May 25, 1943

2,320,242

UNITED STATES PATENT OFFICE 2,320,242

METHOD OF PURIFYING SULPHURIC ACID MIXTURES

Vaman R. Kokatnur, Beechhurst, and Joseph J. Jacobs, Jr., Brooklyn, N. Y., assignors to Autoxygen, Inc., New York, N. Y., a corporation of New York Application April 10, 1940, Serial No. 328,806

3 Claims. (Cl. 196—148)

This invention relates to a method of purifying mixtures of sulphuric acid with oily materials and particularly to the purification of acid sludges such as produced in petroleum refining.

The present application is a continuation in part of application Serial Number 295,000 for U. S. patent filed by us on September 15, 1939.

Because of the very large tonnages involved in the sulphuric acid sludges of petroleum refineries, the invention will be illustrated in detail by reference to the treatment of such sludges.

These refinery sludges are wet. The sulphuric acid in them is too dilute for reuse without concentration. Also, the sludges contain very large proportions of organic materials. Some of these materials are water-soluble. Others are more soluble in common organic solvents than in water. These latter materials are referred to herein as "oily."

Various methods have been proposed or used heretofore for the treatment of these sludges or sulphuric acid solutions. Thus, water has been removed by evaporation in tower systems, by means including a series of pans arranged in cascade fashion, or in rotary kilns. In such evaporations, temperatures as high as 800 to 900° C. have been used in the heating medium, such as gas from oil burner flames, which contacts the sludge being recovered.

As a result of the high temperatures used heretofore, there has been loss of organic material by decomposition in the presence of the sulphuric acid. There has been a concomitant reduction of sulphuric acid, with the generation of large amounts of sulphur dioxide or other products that are objectionable, not only in the effect upon the operators or equipment, but also because their formation represents a loss of sulphuric acid.

It is an object of this invention to recover from petroleum refinery sludges solvent extractable material of value. A further object is to remove water from such sludges at low temperatures, so as to avoid excessive decomposition during the concentration of the sludge. These and such other objects as will appear from the detailed description that follows are secured by means of the method described.

Apparatus that is suitable for use in connection with the method of the invention is shown in the drawing. The figure is a side elevational view. It is in part diagrammatic, and in part sectional.

There are shown a boiling vessel 1 provided with suitable heating means, as, for example, the steam coil 2, and a connecting pipeline 3 extending from the top of the said vessel to the bottom of the fractionating column 4.

The column on its outside is provided with suitable heat insulation 5. The column contains a usual arrangement for securing through contact of a descending liquid with an ascending vapor. Thus, the column may be filled with acid-proof Raschig rings 6, or with such plates (not shown) as are conventional in fractionating columns. Means are provided for supplying the sulphuric acid sludge to the column at a position adjacent to the top of the column, as by means of the pipe 7.

Vapor line 8 connects the top of the column with the condenser 9. Disposed below the condenser is separator 10 for receiving the condensate from 9 and providing means including trapped outlet 11 with valve (not shown) for separating the lower layer and for returning the upper layer through outlet 12 to a position near the top of the fractionating column.

At the bottom of the column there is provided space for receiving liquid which collects there and separates into a lower sulphuric acid layer and an upper layer of residual solvent. There is, also, provided outlet 14 through which there may be passed the lower of the layers which collect at the bottom of the column, the upper layer being returnable to the boiling vessel 1 by means of the line 3.

Materials of construction and parts of the apparatus not shown are conventional.

In operating the equipment, the sulphuric acid sludge is charged as a small stream through inlet 7. The sludge so charged trickles down through the column. At the same time a selected water-immiscible solvent for the oily material is boiled in the vessel 1, so that the vapors pass into the bottom of the column and rise upwardly in the direction of the outlet 8 and condenser 9.

As a result, there is condensed in the condenser a mixture of vapors of water and the said solvent. This condensate forms two layers in the separator 10, the lower or water layer being removed through outlet 11 or at intervals through the valve 13. The upper layer flows continuously through line 12 into the top of the column and serves to condense a certain part of the vapor of the solvent, so as to give proper dephlegmation in the column.

In the operation described the close contact between the sludge and the solvent in the column gives an extraction of solvent-extractable material. The material thus extracted is removed from its original intimate association with the sulphuric acid, so as to decrease the danger of decomposition of either the organic material or the sulphuric acid.

Concentrated sulphuric acid and the portion of the solvent which does not issue as vapor through the line 8 collect at the lower end of the column, as an upper residual solvent layer, and a lower acid layer. The two layers are separated by difference of specific gravity, as, for example, by drawing off the sulphuric acid layer. The upper layer flows back into the vessel 1 where, with continuance of the boiling, the extracted material becomes concentrated.

When the residual solvent is largely evaporated, the boiling vessel is drained. The material thus recovered is the extracted oily material, in relatively concentrated form. It may be neutralized, as with sodium carbonate solution, and used in the treatment of lumber, as an ingredient of certain insect sprays, or in asphaltic road compositions.

As the water-immiscible solvent for use in the method described, there is employed to advantage a material comprising a number of compounds that are mutually soluble in each other and are of closely graded boiling points. Thus, there may be used a mixture of hydrocarbons made by fractionating petroleum and collecting the material which distils at such a temperature that the end boiling point is well above the boiling point of water. Thus, there is used to advantage a cut of end boiling point 210° C., with the initial boiling point around 100° C. or preferably about 150° C.

As the solvent, there may be used in place of the petroleum cut described a mixture of homologous chlorinated or nitrated paraffins, high boiling alkyl ethers, or dialkyl sulphates, say, of boiling point falling within the boiling range of kerosene. Such derivatives that may be used include hexachlorethane, tetrachlorpropanes, trichlorbutanes, dichlorpentanes, nitrobutane, nitropentane, dinitroethane, dibutyl ether, and diethyl sulphate.

Before use, the selected solvent is preferably treated with concentrated sulphuric acid, any extracted material being separated. In this way, there is produced a solvent fraction that is substantially non-reactive with sulphuric acid. Obviously this solvent fraction is substantially a non-solvent for sulphuric acid. This fraction is used as the solvent in the method of the present invention.

When such solvents are used, they maintain a relatively low temperature at the top of the fractionating column and thus cause extraction, at such temperature, of extractable organic materials that are present in the sludge fed to the column, and that, if not removed, would lead to destruction of themselves, sulphuric acid, or both at the higher temperatures prevailing at the lower end of the column.

If, however, the feature of steep temperature gradient through the column is not desired, then there may be used a single liquid, as, for example, one of the chlorinated or nitrated paraffins, or a petroleum hydrocarbon of boiling point, say, between 130 and 210° C.

The invention has been described in connection with the purification and concentration of acid sludges from petroleum refining. It is with such sludges that particularly favorable results are obtained, simply and economically.

The invention is applicable, however, to the purification and concentration of other acid mixtures, as, for example, to a sludge or emulsion containing water, sulphuric acid, oily material extractable by solvent, and the product of the reaction of a fatty oil with sulphuric acid. Thus, the process may be applied to the recovery of used emulsions of turkey red oil. Likewise, the method may be applied to used emulsions of sulphonated oleic acid.

The method may be applied, also, to the removal of water from various commercial sulphuric acid solutions or to the removal of water from solutions of sodium acid sulphate or the like.

Regardless of the particular material selected in place of the petroleum refinery sludge, the said material is supplied to the apparatus and processes as described above in the case of the petroleum refinery sludge, except that no valuable extracted material is recovered from the boiling tank 1. Through the delivery line 14 there issues in any case a solvent-insoluble material, as, for instance, a concentrated aqueous solution of the non-volatile material in the mixture charged through pipeline 7.

The data for typical operations follow:

The hydrocarbon boiler 1 was partly filled with kerosene, with a boiling range of 210–275° C. and heated to the boiling point. When the column 4 was heated, 35% sulphuric acid solution was dripped over the packing in the column. The kerosene and water vapors were condensed in the water-cooled condenser 9 and collected in a graduated vessel. The concentrated acid and kerosene reflux settled to the lower part of the column, where the heavier sulphuric acid was drawn off continuously. A total of 100 parts of acid were fed in and 61 parts of water removed as vapor. The strong acid recovered analyzed 92.5%. The kerosene-water ratio in the distillate was 4:1.

Another operation was performed similar to that described immediately above, except that a kerosene with a boiling range of 150–200° C. was used. In this case the ratio of kerosene to water distilled was 10:1. The concentration of acid recovered was 91.2%.

When no organic material is present with the sulphuric acid, or when the organic matter present is not destructible by the sulphuric acid at temperatures of 300° C. or so, then solvents boiling up to those temperatures may be used, as, for example, high boiling hydrocarbons, chlorinated or nitrated paraffins, or a fraction of petroleum distillate, provided they boil at about 300° C. or within the range 200 to 350° C.

What we claim is:

1. In the purification of a wet sludge resulting from the treatment of a petroleum distillate with sulphuric acid, the method which comprises supplying the sludge in the form of a stream to the upper portion of a fractionating column, passing upwardly through the fractionating column the vapors of a water-immiscible organic solvent of boiling point approximately 100° to 210° C. that is a solvent for the oily material of the sludge but substantially a non-solvent for sulfuric acid, the solvent being adapted to extract oily material from the sludge, condensing the vapors which issue from the top of the column, separating the condensate into a lower aqueous and an upper solvent layer, returning the solvent layer to the upper part of the fractionating column, separating the liquid which collects at the lower end of the column into a lower layer containing sulphuric acid and an upper residual solvent layer containing extracted oily material from the sludge, and then separating the layers from the lower end of the column.

2. In the purification of a wet sludge resulting from the treatment of a petroleum distillate with sulphuric acid, the method which comprises supplying the sludge in the form of a stream to the upper portion of a fractionating column, passing upwardly through the fractionating column the vapors of a water-immiscible organic solvent of boiling point between approximately 100° and 210° C. adapted to extract organic material from the sludge, condensing the vapors which issue from the top of the column, separating the condensate into a lower aqueous and an upper solvent layer, returning the solvent layer to the fractionation system, separating the liquid which collects at the lower end of the column into a lower layer containing sulphuric acid and an upper residual solvent layer containing organic material extracted from the sludge, withdrawing the said sulphuric acid layer, transferring the said residual solvent layer to a boiling vessel connected to the lower part of the column, vaporizing volatile material from the residual solvent in the boiling kettle, and passing the resulting vapors into the lower part of the fractionating column while continuing boiling in the boiling kettle.

3. The method described in claim 1, the said water immiscible organic solvent comprising a mixture of liquids of closely graded boiling points within the range of approximately 100° to 210° C.

VAMAN R. KOKATNUR.
JOSEPH J. JACOBS, Jr.